United States Patent [19]

Ardezzone

[11] 3,832,632
[45] Aug. 27, 1974

[54] MULTI-POINT PROBE HEAD ASSEMBLY
[76] Inventor: Frank J. Ardezzone, 387 Mathew St., Santa Clara, Calif. 95050
[22] Filed: Nov. 22, 1971
[21] Appl. No.: 201,098

[52] U.S. Cl............................. 324/158 P, 324/72.5
[51] Int. Cl......................... G01r 1/06, G01r 31/22
[58] Field of Search............ 324/158 F, 158 P, 72.5; 200/166 C

[56] References Cited
UNITED STATES PATENTS

| | | | |
|---|---|---|---|
| 2,922,954 | 1/1960 | Bigelow............................ | 324/158 P |
| 3,363,076 | 1/1968 | Murakami........................ | 200/166 C |
| 3,377,514 | 4/1968 | Ruehlemann et al. ........... | 324/158 F |
| 3,405,361 | 10/1968 | Kattner et al. .................. | 324/158 P |
| 3,445,770 | 5/1969 | Harmon............................ | 324/158 P |
| 3,596,228 | 7/1971 | Reed, Jr. et al.................. | 324/158 F |
| 3,702,439 | 11/1972 | McGahey et al................ | 324/158 P |

Primary Examiner—Alfred E. Smith
Assistant Examiner—Ernest F. Karlsen
Attorney, Agent, or Firm—Schatzel & Hamrick

[57] ABSTRACT

A multi-point test probe assembly for interface contact with miniature electronic devices. The assembly comprises a plurality of electrically conductive probes each adapted to be electrically engaged to a conductive lead and each probe having a probe arm extending to a common area with a tip adapted for interface contact with a terminal of a miniature electronic device positioned within said common area. The probe tips may be comprised of a compressible elastic material. A probe support member engages each of the probe arms and tips to support the arms and tips about said common area.

6 Claims, 5 Drawing Figures

PATENTED AUG 27 1974  3,832,632

MULTI-POINT PROBE HEAD ASSEMBLY

BACKGROUND OF THE DISCLOSURE

The present invention relates to apparatus for testing miniature electronic devices and more particularly to probing apparatus for interconnecting electronic test instruments and equipment with electronic devices to be tested.

The testing of miniature electronic devices, e. g. semiconductor components, integrated circuits, circuits, etc., is of prime importance to electronic device manufacturers so as to eliminate defective devices prior to and after assembly. For example, in the semiconductur industry it is desirable to test the devices while in wafer or slice form so as to eliminate rejects early in the manufacturing process. There is a continuous emphasis in the electronic industry for performing the wafer tests at higher rates of speed with precise accuracy. At the same time, as miniaturization of devices continues, it is desirable to simultaneously test more and more die positioned on a wafer and more and more pads positioned on a die. Multi-point probes have been commonly used for this purpose. Miniaturization of devices simultaneously dictates smaller and smaller pads closely positioned relative to each other. Presently pads are commonly 4 mils square, although pads of 2 mils square and 2 mils diameter have been used with 1 mil spacing between adjacent pads. Damage to the metallized device pads during the testing operations is of prime concern. Various electronic devices are deposited for probe contact areas where extremely thin layers of metal demand extreme care so as to avoid damage to the pads and circuit faces.

Multi-point probe heads have heretofore been available. In operation the heads are generally mounted on a wafer probing machine. A wafer or other device s positioned on the machine and the probes are guided relative to the pads of the device. The wafer is positioned on a chuck with dies in alignment with the travel path of the probe points. The machine is controlled such that the probe points are brought into contact with the pads of the individual die under test. Probe heads may assume any of various designs. Probe heads may be structured with various numbers of points aligned in various configurations depending on the number of pads and configuration of the device to be tested. The probe heads and probing machine are designed such that the probe heads may be readily interchanged. It is common for a wafer to carry a plurality of die of similar configuration such that the die may be individually and successively tested by a probe head. Upon receipt of a wafer carrying die of a different configuration, probe heads may be interchanged such that the installed probe head has a configuration compatible with the die to be tested.

A further desirable feature of probe heads is to include provisions for marking die which do not meet the test criteria. Such provisions may include an ink dispenser for discharging an ink mark to the die surface when said die does not meet the test criteria such that said die may be subsequently rejected.

The intergrity of the connection between the probe points of the probe head and the pad of the die, the mechanical properties of the pad, the mechanical properties of the oxide layer below the pad, and the device active system, if any, under the pad are prime considerations in the design of test probe apparatus. Heretofore due to the probelm of oxide fracture during testing, semiconductor devices have been commonly designed with passivating areas below the pads and the active components remotely positioned from the pads. Test probe systems heretofore availabe in the electronics industry have generally been structured to realize an interface probe pressure of approximately five grams and a contact point radius area in the order of 0.0005 inches. The probe point material generally comprises pure tungsten, a tungsten alloy or a beryllium-copper alloy. These materials exhibit inherent limitations. Tungsten exhibits a high contact resistance and a high internal resistance. Beryllium-copper, though it exhibits less internal resistance than tungsten, when used in the raw state presents an oxidation problem fostering a relatively poor electrical contact. The tungsten alloys are generally not suited for use as spring member which is a function generally required of probe points.

In multi-point probe heads heretofore, it was common for the Kelvin connections to be offset from the probe points such that the probes are suspended and free to deflect in all three orthogonal planes. Accordingly, as the probe point makes contact with the pad, the probe point deflects vertically in the Z plane and simultaneously deflects horizontally across the pad due to the vertical action of the probe. The horizontal deflection is known as "horizontal skid" or "scrub" and tends to damage the device by producing a gouge in the pad. The probe points, during the "horizontal skid" action, tend to function like a "snow plow" sliding horizontally across the pad causing gouging of the pad material. The pad material tends to accumulate about the gouge similar to the action of a snow plow. The degree of "horizontal skid" is a function of the angle of incidence of the probe point with the probing plane and vertical Z axis travel.

Probe heads heretofore having suspended points have been limited as to the number of points that can be accommodated with assurance of reliable operation. There are numerous inherent factors which limit the number of points. Each point is subject to deflection about three axis (x, y and z); each point is a mechanical system in itself subject to wear and tear; and each point is subject to misalignment and damage from repeated usage. The probe points, being suspended, require careful handling by individuals when the probe is not in use and during mounting and dismounting from the machine.

SUMMARY OF THE PRESENT INVENTION

An objective of the probe head of the present invention is to provide a probe head which eliminates horizontal skid while providing a contact of high integrity and kelvin connections close to or at the pad area.

Another objective of the probe head is to provide low contact resistance, low internal resistance and high current carrying capacity.

A further objective is to provide a probe head adapted to accommodate test circuitry close to the pad area.

A further objective is to provide a probe head which lends itself to including a large number of probe points, dependability and long, useful life.

A further objective is to provide a probe head in which the required human dexterity of the machine operator is minimized.

A further objective is to provide a probe head which may be manufactured at low cost.

An exemplary embodiment of a probe head assembly of the present invention includes a transparent support member on which a plurality of probe arms and probe points are secured. The probe arms each comprise a thin film of material etched from and supported about the bottom side of the support member. Each arm carries a probe point about its terminus with the points arranged in a configuration compatible with the configuration of the pads on the device to be tested, e.g. a die of a semiconductor wafer.

The support member supports the points and discourages any flexure of the probe arms when said points make interface contact with the device. The probe arms are visible from the top side of the support member such that the individual operator may align the pads with said probe arms and probe points positioned thereon. The probe machine may then transport the probe head along the vertical plane to bring the points into interface contact with the pads.

The probe point material comprises an elastic compressible material with a memory such that upon making contact with the pad, the probe point distorts to increase the interface surface area without fracture to the pad or/and device and without skidding of the probe tip horizontally across the pad. Upon release of the probe point from the pad, the probe point assumes its original shape. Accordingly, even with some misalignment of the probe points and/or pads, the points may absorb some override to permit all points to make point contact with their respective pads.

DESCRIPTION OF PREFERRED EMBODIMENT

Figure 1:
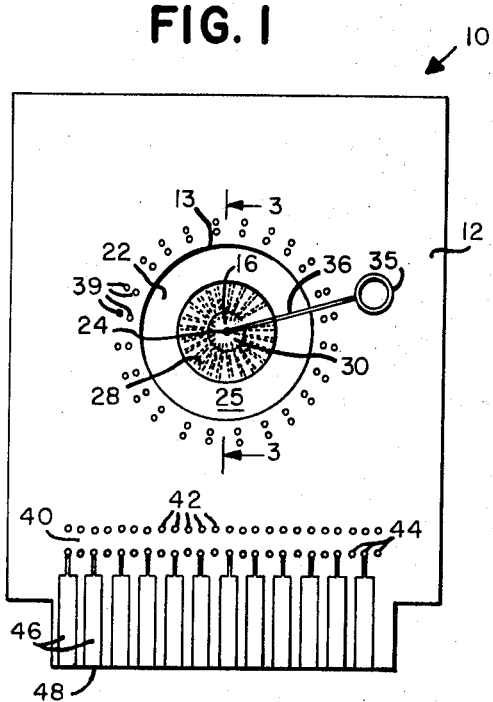
FIG. 1 is a top perspective view of a test probe assembly incorporating the teachings of the present invention.

The present invention provides a microminiature, nondestructive electronic test probe.

The drawings depict such a test probe assembly referred to by the general reference character 10, and incorporating the teachings of the present invention. As illustrated the test probe assembly 10 is in the form of a fixed-point head adapted for mounting on a probing machine to probe a plurality of miniature electronic devices simultaneously; for example, several transistors, diodes and/or complex integrated circuits with test pads inside the die or about the periphery. The assembly 10 includes a printed circuit board 12 adapted to provide a platform for carrying a wiring harness in the form of traces, extending to the probes and for incorporating auxiliary test circuitry and test devices near the area being probed. The board 12 carries an opening 13 illustrated in the form of a circle generated about an axis 14.

Figure 5:
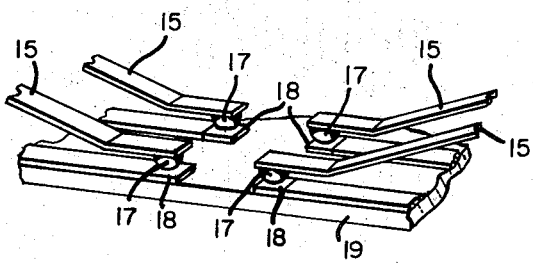
FIG. 5 is an enlarged, partial, sectioned perspective view of a segment of a probe head and a segment of a die with the probe points in contact with pads of said die.

The test probe assembly 10 includes a plurality of thin film probe arms 15 each extending towards and terminating at a common area 16 in a pattern, illustrated as of rectangular, configuration. Each of the probe arms 15 engages a hemispherical-shaped probe tip 17 about its terminus. The probe arms 15 may comprise nickel-plated pure copper with a gold flash; nickel-plated aluminum with a gold flash, or other high conductive material. The common area 16 generally assumes a configuration similar to that of the format of the pad arrangement of the device to be tested such that the tips 17 of the probes 15 may interface with the test pads. For illustrative purposes FIG. 5 illustrates an enlarged segment of the assembly 10 with the tips 17 in interface contact with the pads 18 of a die 19.

Each probe arm 15 and tip 17 is carried by a probe reference member 20 preferrably comprised of a transparent mylar material. The probe reference member 20 generates a conical, concave funnel-like support mounted to the bottom side of the board 12 coaxial with the axis 14. The reference member 20 carries the individual probe arms 15 which may be etched from the member 20 in accord with the pad pattern of the device to be tested. The techniques to produce the probe arms 15 and probe arm pattern may be the same as the teachniques to produce the device to be tested. Accordingly, the pad pattern of the device may be readily duplicated on the probe.

About the top surface of the reference member 20 and within the opening 13 of the board 12 is a transparent fixed probe support member 22 adapted to support each of the probe arms 15 and probe tips 17. The member 22 supports the probe arms 15 and tips 17 through the reference number 20 and supports the tips 17 in the x, y, and z orthogonal directions. The member 22 assumes a conical shape with a central opening 24 coaxial with the axis 14. The member 22 has a top ledge surface 25 which abuts with the printed circuit board 12 about the periphery 13. The member 22 carries an inner cavity 26 formed by a tapered side wall 28 extending to a horizontal, circular bottom wall 30 generated about the opening 24. The bottom side of the probe support member 22 includes a tapered side wall 32 integral with a rectangular, horizontal wall 34 generated about the opening 24. The wall 32 extends to a flange 35 adapted to engage the bottom side of the board 12 about the opening 13. The surfaces 32 and 34 are in intimate, flush contact with the reference member 20 to provide physical support to said member 20, the probe arms 15 and the probe tips 17. The support member 22 is intimately secured to the printed circuit board 12 and to the member 20. The support member 22 secures the probe arms 15 and tips 17 in place to discourage flexure of the tips 17 in the planar x,y and z directions. The support member 22 may be comprised of a transparent thermosetting epoxy such that an individual may readily visually sense the position of the probe arms 15 and tips 17 for alignment with pads of the device to be tested.

The inner cavity 26 of the member 22 provides for decreased thickness of the support member 22 about the tips 17 to provide improved visibility through the member 22 to the tips and pads of the device to be tested. At the same time the cavity 26 provides accommodation to receive an inker adapted to dispense ink which ink, in turn, penetrates through the aperture 24 of the common area 16. Inks are commonly used to mark die or wafers which do not meet the test requirements. For illustrative purposes FIG. 1 carries an ink well 35 with an ink pen 36 extending therefrom. The ink pen 36 functions pursuant to capillary action such that when the pen is deflected, ink is dispensed from the pen point to penetrate through the aperture 24.

The printed circuit board 12 carries a plurality of traces 37 about its bottom side. Each trace 37 extends to the opening 13 so as to overlap the reference member 20 in alignment with an individual probe arm 15. Each probe arm 15 is electrically interconnected with a trace 37 by means of an interconnect 38 illustrated in the form of a solder bead. Said interconnect 38 may be in the form of a solder bead, spot weld or other means to provide electrical continuity between each of said probe arms 15 and probe tips 17 and an associated trace 37. Each of the traces 37 is interrupted by a pair of terminal posts 39 adapted to permit the interconnection of electronic test circuitry, e.g. amplifiers, buffers, and so forth, near the probe tips. The posts 39 protrude through the board 12 to permit connection to said test circuitry without interference of the probes and traces.

Figure 2:
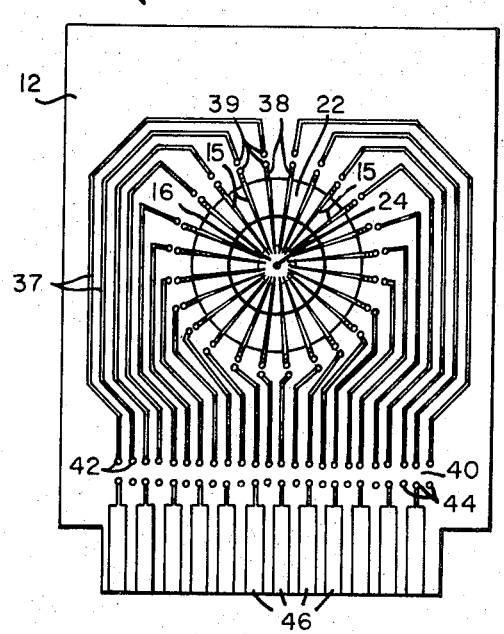
FIG. 2 is a bottom perspective view of the probe assembly of FIG. 1.
Figure 3:
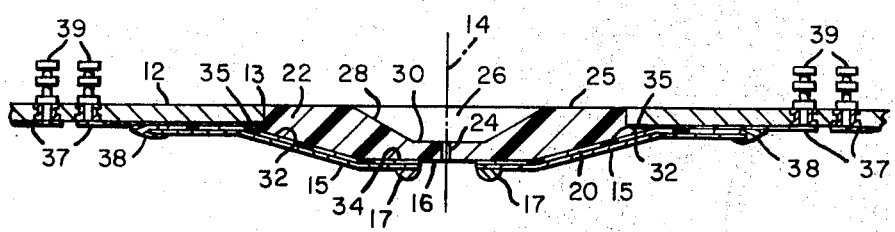
FIG. 3 is an enlarged cross-section view taken along the line 3—3 of FIG. 1.
Figure 4:
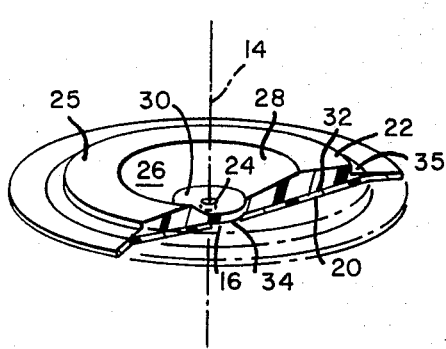
FIG. 4 is an enlarged view of the probe point support member of FIG. 1.

Each of the traces 37 extend about the bottom side of the board 12 to a common terminal strip 40 as shown in FIG. 2. The terminal strip 40 comprises a plurality of individual trace terminations 42 of electrical conductive material. Each trace termination 42 comprises a plated through hole extending through said board 12. Spaced laterally from each rivet 42 is a terminal post 44. Each post 44 is common to a trace 46 extending to a disconnect plug section 48 of the board 12. Alternate traces 46 are supported on the top side of the board 12 and alternate traces 46 are supported on the bottom side of the board 12. In application selected trace terminations 42 and 44 may be interconnected directly depending on the application.

As illustrated, the probe assembly 10 provides a structure in which the individual probe arms 15 and tips 17 are physically supported and retained in fixed position relative to the support member 22 and printed circuit board 12 even after interface contact with the pads of the device under test. The probe arms 15 and tips 17 are fixed in all three orthogonal planes relative to the support member 22 and the printed circuit board 12. The support member 22, being transparent permits the operator to align the probe tips 17 relative to the pads on the semiconductor devices to be tested. At the same time the probe arms may be etched and made in the same procedure as the devices to be tested, thereby readily permitting duplication of the pad pattern of said devices.

In operation the probe assembly 10 may be guided along the vertical ($z$) axis relative to the device to be tested. The probe tips make contact with the device. Upon making contact, the probe arms retain their respective position such that there is no horizontal skid across the device. As pressure is applied, point contact is made between the device pads and the tips 17. The tips are comprised of a compressible, elastic material which permits the tips to assume and absorb the deformation and override necessary to permit all of the probe points to make interface contact with associated pads of the device to be tested and at the same time relieve the pads of the task of absorbing the force otherwise encountered from override. To achieve said objectives, the material of the tips 17 comprises a memory permitting it to return to its original shape upon being released from contact with the associated pads.

In constructing probe assemblies of the present invention it has been found that the tips 17 may be built up over the probe terminus such that the tips assume a spherical shape. Exemplary tips may assume a diameter-to-height ratio in the approximate order of two-to-one with the diameter being approximately in the order of 0.004 inch and the height approximately in the order of 0.002 inch, although tips in the order of 0.010 inch height with a base diameter of 0.005 inch have been used. Probe tips and circuit pads, with present technology can readily be structured to an accuracy of ± 0.0002 inch. At the same time good electrical contact is realized with a travel override of approximately 0.0010 inches from the point of initial contact of the tip and pad. Accordingly, flexure of the tip may be in the order of 0.0005 to 0.003 inch to assure good interface contact of all tips on the probe head with pads of the device. Besides providing for the desired flexure, the tip material preferably possesses low oxidation rates or high resistance to oxidation and high conductivity, i.e., low contact resistance and low internal resistance, to assure accurate test results. The material exhibits high resistance to wear and good physical and electrical stability so as to permit it to be repeatedly used over an extended life without significant alteration in its physical and electrical properties.

An exemplary contact material comprises silver and rhodium particles suspended in a silicon rubber base material. The silver particles provide for high conductivity. The rhodium particles serve as a low oxidizing contact material which in granular form provide sharp corners. The sharp corners facilitate microscopic piercing of the aluminum oxide layer of the pad area to facilitate the interface contact. The silicon rubber base possesses the compressible elastic properties permitting the contact to absorb the necessary flexure while exhibiting physical stability to permit the contact to repeatedly resume the original shape when out of contact with the pad. At the same time, the silicon rubber base protects the conductive particles from the atmosphere thereby preventing oxidation. Exemplary mixtures include rhodium particles of 12–15 microns, silver particles of 5–70 microns and silicon rubber of a durtameter rating in the range of 15–30.

The probe support member 22 is comprised of a transparent material to permit the individual to visually sense the pads of the device to be tested. The material is preferably selected of a color to be compatible with the device under test. For example, clear materials may be used. Also, red transparent materials, e.g. thermosetting epoxy may be used. Red materials are compatible with light emitting diodes and are commonly mandatory for realizing reliable testing of light emitting diodes.

The present structure is adapted so as to accommodate a significantly large number or probes in turn accommodating devices having a large number of pads. Though the principal limit is dictated by the needs of the industry, probe assemblies in accord with the present invention may be readily provded with the number and size of tips to accommodate the industry's needs. Presently probe heads having 50, 100, 200, 400 and 800 tips have been designed.

The present structure assures repeated mechanical alignment of the tips relative to one another, thereby reducing the probability of misalignments of probe tips which may otherwise result from repeated usage or mishandling during storage or mounting to a machine. Set up time of the machine in replacing or exchanging probes is greatly facilitated. During usage of the probe head, the operator need only be primarily concerned with alignment of the wafer relative to the probe array. The individual probe arms are all physically stationary relative to one another such that upon interface with a pad the individual probe arms are not deformed or deflected. Deformation takes place at the probe tip 17, which tip is designed of a material permitting it to function as a deflecting member. The tip 17 deflects without imparting horizontal skid or damage to the pad of the device under test.

The total cycle life of probes, in general, is directly related to the amount of deformation and deflection which the probe arms and tips need withstand in regard to the ability of the material to absorb the deformation stresses and stains induced therein. In the present structure, deflection and deformation is minimal thereby significantly prolonging the cycle life of the assembly relative to that of other assemblies heretofore commonly used.

I claim:

1. A multi-point test probe head assembly for interface contact with minature electronic devices to be tested, the assembly comprising, in combination:
   a platform carrying a wiring harness for electrical interconnection with electronic test instruments;
   a rigid probe support member integrally secured to the platform, the support member establishing a rigid planar support wall about a common area; and
   a plurality of electrically conductive probes each electrically coupled to said wiring harness, each of the probes having a probe arm extending to said common area and an electrically conductive tip contact secured about the terminus of the arm, said tip contacts being adapted for interface contact with terminals of miniature electronic devices when said devices are positioned adjacent to said common area, said tip contacts each being engaged to said horizontal support wall and arranged in a pattern format consistent with the pattern format of the terminals of the device to be tested, said tip contacts being further comprised of an elastic, compressible conductive material with granular particles of highly electrically conductive metals suspended in a rubber base material, some of said particles having hard sharp corners; whereby said particles having sharp corners may penetrate an oxide layer over the terminals of the electronic devices contacted by said tips.

2. The test probe assembly of claim 1 wherein said tip contacts are comprised of a material including silver particles.

3. The test probe assembly of claim 1 wherein said tip contacts are comprised of a material including silver particles and rhodium particles.

4. The test probe assembly of claim 1 wherein said tip contacts are comprised of a material including silver particles and rhodium particles suspended in a rubber base material.

5. The test probe assembly of claim 1 wherein said probe arms are comprised of a film material supported in place by the probe support member and the tips are of a hemispherical shape.

6. A multi-point test probe head assembly for interface contact with miniature electronic devices to be tested, the assembly comprising, in combination:
   a platform carrying a wiring harness for electrical interconnection with electronic test instruments;
   a rigid probe support member integrally secured to the platform, the support member being of tapered cross-sectional dimensions with the member tapered towards a common area and establishing a planar plateau at said common area for alignment with the contacts of electronic devices to be tested;

a plurality of elongated electrically conductive probes each electrically coupled to said wiring harness and having a probe arm portion of a film of electrically conductive first material, the probe arm portion of each probe being extended to said common area with the terminus end and at least a portion of each of said probe arm portions extending from its terminus end being affixed to the planar surface of said planar support wall of the rigid probe support member to form inflexible electrical current conducting leads, a bead of an electrically conductive second material affixed to and about said terminus end of each of said probe arm portions to form tip contacts within the common area for engaging terminals of a miniature electronic device when said device is positioned adjacent to said common area with said tip contact with the electronic device being tested; and
   electrical terminal means adjacent the other terminal end of said probes for interrupting the electrical continuity of said probe and said harness, the terminal means being adapted to receive electronic test circuitry about said platform.

\* \* \* \* \*